Patented Feb. 22, 1949

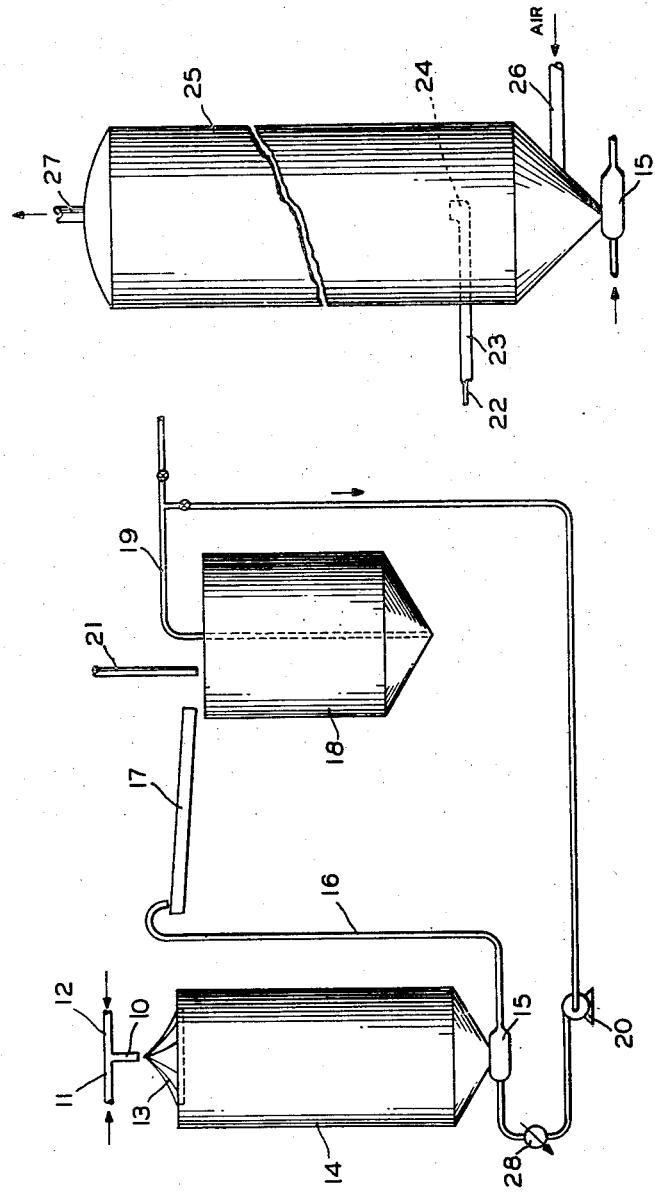

2,462,798

UNITED STATES PATENT OFFICE 2,462,798

MANUFACTURE OF DESICCANTS

Robert C. Wilson, Jr., Woodbury, N. J., assignor to Socony-Vacuum Oil Company, Incorporated, a corporation of New York Application April 16, 1946, Serial No. 662,455

12 Claims. (Cl. 252—300)

This invention relates to an improvement in the manufacture of inorganic oxide gels for use as desiccating agents and adsorbents generally. The invention is specifically directed to the manufacture of inorganic oxide gels comprised predominantly of silica and having a high capacity to adsorb moisture over a wide range of relative humidities. According to a specific preferred embodiment, the invention is of particularly high value in the manufacture of spheroidal particles of desiccant comprised predominantly of silica.

Gels of various hydrated anhydrous inorganic oxides have been known over a long period of years and have achieved considerable commercial success in various fields since the invention by Patrick of a method for manufacturing the gels on a commercial scale, see U. S. Patent No. 1,297,724. The term "gel" has a rather loose meaning, as presently used in the art, to designate the porous dried solid resulting from removal of water from gelatinous precipitates, hydrogels and mixtures of the two. Since this invention is peculiarly directed to products of drying true hydrogels, a distinction must be drawn between the true hydrogels and the gelatinous precipitates. In certain of its aspects the invention includes mixtures of gelatinous precipitates and hydrogels where the mixture is set to a firm body resembling a hydrogel which includes gelatinous precipitates separated from the sol before gelation.

In general, the hydrogels and gelatinous precipitates are formed by coagulation of a hydrosol. The hydrosol is an aqueous suspension of a water-insoluble inorganic oxide in which the suspended particles are extremely fine. If the dilution is not too great, the suspended particles will separate out from the clear limpid sol to form a separate solid phase. The nature of this coagulation is not fully understood but the generally accepted theory is that a firm gel enclosing all the constituents of the sol will be formed if conditions are proper for the solid to separate out relatively slowly giving individual particles adequate time for orientation. If conditions are not proper for hydrogel formation, coagulation will result in a gelatinous precipitate including substantial amounts of water but separating from the main body of the liquor as a slimy mass. Some sols cause separation of gelatinous precipitates and the remaining liquor subsequently sets to a true hydrogel inclosing the gelatinous precipitate. In such case, a firm, somewhat resilient body is formed which includes all the components of the original sol but is structurally weakened by the inclusion of masses of gelatinous precipitate.

After a true hydrogel is formed, it undergoes a process known as syneresis during which the gel (whether or not it includes gelatinous precipitate) shrinks and exudes liquor, becoming somewhat harder and firmer in the process. Generally, the hydrogel is permitted to undergo syneresis and is then washed to free it of soluble salts resulting from the sol-forming reaction whereupon it is dried to the degree desired and may be activated for the intended use. The coagulation of the hydrosol may be induced or hastened by the addition of chemical reactants thereto, notably ammonia, and the preparation of gelatinous precipitates can be similarly induced or hastened. For the most part, silica hydrosols can be converted to the corresponding hydrogels solely by the passage of time and the interval required, known as the gelation time, is a factor of acidity, concentration and temperature in the absence of electrolytes and the like added to the previously formed sol. In general, gelation time decreases with increase in temperature or concentration of silica and follows a characteristic curve with respect to pH.

Most of the silica gel intended for use as desiccants prior to this invention has been manufactured by forming a silica hydrosol at a pH of about 1 having a gelation time of 12 hours to a day or more. This sol is maintained in a suitable vessel until gelation takes place. After a period of time to permit syneresis, the hydrogel is broken up and washed with water to remove the soluble salts, e. g., sodium sulfate, produced when the sol is formed by mixing water glass and sulfuric acid. After a suitable washing period, the hydrogel is dried thus causing considerable shrinkage to obtain a glassy, hard material in the form of fragments, resembling those obtained by breaking a block of glass. These fragments show the characteristic conchoidal fracture and sharp edges and corners found in broken glass.

The present invention provides an improvement in this previously known process and, as a preferred embodiment, provides means for producing a high quality desiccant according to the bead technique described in U. S. Patent No. 2,384,946 issued September 18, 1945 to Milton M. Marisic.

According to the bead process a hydrosol having the inherent property of setting to a firm hydrogel upon the lapse of a suitable period of time, is separated into particles and suspended in a fluid immiscible therewith until gelation occurs. The suspended globules of hydrosol assume spheroidal shape under the influence of surface tension and the resultant gel is in the form of spheroidal pellets. For most economical use, the bead technique requires a hydrosol of relatively short gelation time, say 1 to 10 seconds.

The uniform shape and size of beads prepared as described in the said patent renders such gels highly advantageous for any process involving contact with a fluid as in desiccating. A bead desiccant permits better diffusion of air through the desiccant mass and, consequently, better utilization of adsorptive capacity than conventional granular commercial desiccants. The spheroidal shape and high crushing strength of bead desiccants avoid the attrition and dusting losses heretofore encountered. The jagged edges and dust of present commercial desiccants require the use of paper-lined, cloth bags for handling, for example for dehydrating the atmosphere inside shipping containers. Bead desiccants can be safely used in cheap loosely-woven bags.

As a further important advantage, the bead desiccant can be handled in continuous dehumidifying apparatus wherein the desiccant is continuously circulated between a desiccating chamber wherein it is contacted with air and a reactivating chamber wherein it is contacted with a hot regenerating gas to recover its adsorptive capacity.

The invention contemplates improvement in the quality of conventional granular desiccant and improvement in bead desiccants by chilling the gel promptly after formation. For some reason that is not understood, this chilling of the gel during the time syneresis takes place results in improved desiccating capacity. Preferably, the chilling takes place immediately after gelation and the hydrogel is maintained at a reduced temperature for a substantial period, usually at least about three hours. However, I have found real improvements in desiccating capacity when the gel is maintained at the reduced temperature for elapsed times up to nine hours. The degree of reduction in temperature normally determines the degree of improvement, but, so far as can be determined, any substantial reduction in temperature for any substantial period of time, no matter how short, results in improvement in this respect. Rapid cooling is more effective than slow cooling and, in general, it is preferred that the gel shall be cooled at a rate not substantially less than 3° F. per minute. In actual practice of the invention, the hydrogel is immersed in cold water promptly after formation and is thus very rapidly cooled to obtain maximum improvement of the desiccant.

It may be noted that a good desiccant can be manufactured by the process described in the above noted Marisic patent without cooling. To achieve this result the bead hydrogel is submitted to a base exchange reaction promptly after the bead hydrogel is formed. By this method, however, the advantages of the bead process, aside from economies in handling, are largely lost since the hydrogel breaks extensively upon drying. In order to avoid these breakage losses, it is necessary to age the bead hydrogel by retaining it in a body of aqueous liquid for a matter of hours before base exchanging for removal of zeolitic sodium. This aging before base exchange drastically reduces the adsorptive capacity and results in a poor desiccant unless the aging is at reduced temperature.

Some breakage of the bead hydrogel occurs on drying in any event but this can be reduced in severity by including a small amount of certain metal oxides in the hydrogel. Alumina is particularly valuable for this purpose but other metal oxides such as zirconia and ferric oxide and many others have effects of the same nature. Large amounts of such metal oxides tend to reduce desiccating capacity and best results have been obtained with about 1% by weight (dry basis) of a metal oxide such as alumina. Up to about 3% by weight can be tolerated but larger amounts seriously decrease adsorptive capacities in the 10 to 40% relative humidity range. The metal oxide may be introduced into the hydrogel by inclusion of a metal salt such as aluminum nitrate in the hydrosol or by base exchanging the hydrogel with an aqueous solution of a metal salt.

The nature of the aqueous solution in which the hydrogel is immersed after formation can also have an appreciable effect on breakage during drying. Small amounts of salts in the water appear to stabilize the gel and cause it to retain its form much better. Dilute solutions of sodium sulfate, sodium silicate and other salts have been found satisfactory for this purpose. A good source of stabilizing liquid is water in which a previous batch of gel has been soaked or washed and which contains water soluble materials of about the same nature and concentration as those in the aqueous phase of the hydrogel.

The objects and advantages pointed out above and additional benefits of the invention are best demonstrated by reference to a number of batches of desiccant prepared during development of the invention. Since the invention is of particular importance in connection with bead desiccants, that specific embodiment is used as exemplary in general discussion and apparatus therefor as shown in the annexed drawings; wherein Figure 1 is a somewhat diagrammatic elevation of apparatus for forming bead desiccants by introduction of a silica hydrosol to a water immiscible liquid; and Figure 2 is an elevation of a chamber for forming the hydrogel beads in a gaseous medium.

In referring to the gels generally herein, the same are denoted as silica gels. That term is used in the sense of designating the characterizing constituent of the gel and is not intended to exclude small amounts of other materials such as metal oxides incorporated for stabilizing the gel as to form.

Referring specifically to Figure 1, a gelable hydrosol is formed in a mixing nozzle 10 from suitable aqueous solutions such as water glass and acid supplied thereto by pipes 11 and 12. Where it is desired to incorporate a metal oxide in the hydrogel at the time of formation, a suitable compound of the metal may be added to one of the reactant solutions. For example, aluminum sulfate may be added to the acid solution or sodium aluminate may be added to the water glass solution. The sol continuously formed in nozzle 10 is flowed therefrom onto the apex of a conical divider 13 having a large number of grooves down the sides thereof. The lower portion of the divider 13 is at or adjacent to a body of a water immiscible liquid, such as a petroleum fraction, within vessel 14. Underlying the water immiscible liquid is a layer of water, or aqueous solution, and the streams of sol from divider 13 separate into globules and gel while in the body of oil, thereafter passing as firm hydrogel spheroids into the water in the bottom of vessel 14. The gel spheroids collecting in the bottom of vessel 14 move downwardly into an injector 15 wherein they are entrained in a stream of water and carried by pipe 16 to a flume 17 which conveys them to a tank 18. The water is recycled through pipe 19, pump 20 and cooler 28 to the injector 15. By this means, the bead hydrogel is picked up by a stream of cold water and is thereby very rapidly chilled and carried to a body of cold water wherein it remains for the time desired to prevent breakage of the final desiccant. After the tank 18 has been filled with bead hydrogel, flow from the flume 17 is diverted to another similar tank and, after a suitable soaking time at the reduced temperature, a washing solution is introduced to the tank 18 by pipe 21. The washing solution may advantageously be that withdrawn from a previously similar tank in the system, each washing tank being progressively moved up in a series of such tanks until it is receiving fresh water to be sent through the entire series. Base exchange solutions such as ammonia salts and/or metal salts may be introduced at an intermediate point in the series to remove zeolitic sodium from the following tanks.

In the apparatus of Figure 2, reactant solutions are introduced by pipes 22 and 23 to a nozzle 24 from which they are sprayed into a vessel 25. Since the sol falls rather rapidly through the vessel 25, it is desirable that it shall have a very short gelation time and this can be achieved by preheating the solutions supplied through pipes 22 and 23 and spraying them from the nozzle immediately upon formation. Air can be introduced by pipe 26 and exhaust withdrawn at 27 to modify conditions as to humidity, temperature or time of suspension of the sol in vessel 25. The sol should not be heated to a temperature above its boiling point either before or after entering vessel 25 since evaporation before chilling will expand the droplets of sol and result in rather fragile bubbles of gel. The small hydrogel beads are withdrawn at injector 15 and may thereafter be treated in a manner similar to the flow in Figure 1.

EXAMPLE I

A batch of bead hydrogel was prepared after the manner of Figure 1 by mixing together an acid and a water glass solution at the rate of 1.0 volume of acid to 1.13 volumes of water glass. The acid solution was made up to contain 1.12 weight per cent $Al_2(SO_4)_3$, 6.68 weight per cent $H_2SO_4$, and 92.20 weight per cent water and the water glass solution was obtained by diluting 1.0 volume of "N" brand sodium silicate (28.7% $SiO_2$, 8.9% $Na_2O$) with 1.27 volumes of distilled water. This yields a sol having a pH of 7, a gelation time of about 5 seconds and containing 1.2% by weight alumina on a dry basis.

A sample of the bead hydrogel was aged for 9 hours at 74° F. before base exchanging. It was then base exchanged by applying fresh portions of dilute aqueous solutions of aluminum sulfate every 2 hours for a total of 18 hours; this operation was performed at 80° F. The hydrogel was then washed at 83° F. until it was essentially free of soluble salts, dried, and activated. Inspections of the finished product were as follows:

Yield of whole beads, weight percent_____ 84.0
Adsorption capacity, weight per cent moisture @ 77° F.:
    With 10% rel. hum. air_____ 5.7
    With 20% rel. hum. air_____ 9.3
    With 40% rel. hum. air_____ 19.6
    With 60% rel. hum. air_____ 35.3
    With 80% rel. hum. air_____ 43.9

EXAMPLE II

Another sample of the batch of bead hydrogel described in Example I was base exchanged at 77° F. immediately after formation. It was washed at 82° F. until it was essentially free of soluble salts, then dried and activated. The experimental technique employed was identical with that used in Example I. Inspections of the finished product were as follows:

Yield of whole beads, weight per cent_____ 26.6
Adsorption capacity, weight per cent moisture @ 77° F.:
    With 10% rel. hum. air_____ 8.4
    With 20% rel. hum. air_____ 12.5
    With 40% rel. hum. air_____ 22.1
    With 60% rel. hum. air_____ 30.2
    With 80% rel. hum. air_____ 32.2

EXAMPLE III

A third sample of the batch of bead hydrogel described in Example I was cooled immediately after formation to 44° F. and aged for 9 hours at 44° F. before base exchanging. The first 6 hours of the base exchanging was performed at 42° F. and the last 12 hours at 76° F. The hydrogel was washed at 81° F. until it was essentially free of soluble salts, then dried and activated. The experimental technique employed was identical with that used in Example I. Inspections of the finished product were as follows:

Yield of whole beads, weight per cent_____ 92.0
Adsorption capacity, weight per cent moisture @ 77° F.:
    With 10% rel. hum. air _____ 7.5
    With 20% rel. hum. air _____ 11.8
    With 40% rel. hum. air _____ 22.0
    With 60% rel. hum. air _____ 34.0
    With 80% rel. hum. air _____ 37.8

To investigate the effects of various times of aging at a reduced temperature before base exchanging, the following experiment was performed:

EXAMPLE IV

Four samples of the batch of bead hydrogel described in Example I were cooled immediately after formation and aged for 0, 3, 6, and 9 hours, respectively, at about 46° F. before base exchanging; in the "0 hours" of aging the cold base exchange solution was put on the bead hydrogel immediately after its formation. The first 6 hours of the base exchanging of all four samples was performed at about 44° F. and the last 12 hours at about 77° F. The samples were washed at about 81° F. until they were essentially free of soluble salts, then dried and activated. The experimental technique employed was identical with that used in Example I. Inspections of the finished products were as follows:

| Aging Time, Hrs | 0 | 3 | 6 | 9 |
|---|---|---|---|---|
| Yield of Whole Beads, Wt. Per cent | 55.5 | 92.8 | 91.2 | 92.0 |
| Adsorption Capacity, Wt. Per Cent Moisture @ 77° F.: | | | | |
| With 10% Rel. Hum. Air | 6.9 | 8.2 | 8.3 | 7.5 |
| With 20% Rel. Hum. Air | 11.0 | 12.6 | 12.4 | 11.8 |
| With 40% Rel. Hum. Air | 20.6 | 22.5 | 23.6 | 22.0 |
| With 60% Rel. Hum. Air | 28.0 | 32.4 | 35.1 | 34.0 |
| With 80% Rel. Hum. Air | 30.2 | 35.1 | 38.7 | 37.8 |

To investigate the effects of various temperatures of aging before base exchanging, the following three experiments were performed.

EXAMPLE V

A batch of bead hydrogel was formed so that the fresh hydrogel contained 1.0% wt. alumina on a water-free basis. A sample of the bead hydrogel was aged for 3 hours at 78° F. before base exchanging. The entire base exchanging operation was performed at 81° F. The hydrogel was washed at 80° F. until it was essentially free of soluble salts, then dried and activated. The experimental technique employed was identical with that used in Example I. Inspections of the finished product were as follows:

Yield of whole beads, weight per cent _____ 20.3
Adsorption capacity, weight per cent moisture @ 77° F.:
    With 10% rel. hum. air _____ 6.2
    With 20% rel. hum. air _____ 9.6
    With 40% rel. hum. air _____ 20.1
    With 60% rel. hum. air _____ 38.6
    With 80% rel. hum. air _____ 48.7

EXAMPLE VI

Another sample of the batch of bead hydrogel described in Example V was cooled immediately after formation and aged for 3 hours at 63° F. before base exchanging. The first 6 hours of base exchanging was performed at 62° F. and the last 12 hours at 79° F. The hydrogel was washed at 81° F. until it was essentially free of soluble salts, then dried and activated. The experimental technique employed was identical with that used in Example I. Inspections of the finished product were as follows:

Yield of whole beads, weight per cent _____ 45.7
Adsorption capacity, weight per cent moisture @ 77° F.:
    With 10% rel. hum. air _____ 6.0
    With 20% rel. hum. air _____ 9.7
    With 40% rel. hum. air _____ 21.2
    With 60% rel. hum. air _____ 36.6
    With 80% rel. hum. air _____ 43.3

EXAMPLE VII

A third sample of the batch of bead hydrogel described in Example V was cooled immediately after formation and aged for 3 hours at 44° F. before base exchanging. The first 6 hours of base exchanging was performed at 45° F. and the last 12 hours at 79° F. The hydrogel was washed at 81° F. until it was essentially free of soluble salts, then dried and activated. The experimental technique employed was identical with that used in Example I. Inspections of the finished product were as follows:

Yield of whole beads, weight per cent _____ 93.8
Adsorption capacity, weight per cent moisture @ 77° F.:
    With 10% rel. hum. air _____ 7.9
    With 20% rel. hum. air _____ 12.1
    With 40% rel. hum. air _____ 23.5
    With 60% rel. hum. air _____ 35.7
    With 80% rel. hum. air _____ 39.1

A comparison of the adsorption capacity data for Examples V and VII shows that this method of process control of the wet hydrogel affords an excellent method of predetermining the adsorption capacity of the finished product. Thus, for any given low-alumina hydrogel, to produce a dehydrating agent having high adsorption capacity with 10%, 20%, and 40% relative humidity air at 77° F. at a sacrifice of the adsorption capacity with 60% and 80% relative humidity air, processing temperatures of the order of 40° F. would be used. Conversely, with the same hydrogel, to produce a dehydrating agent having high adsorption capacity with 60% and 80% relative humidity air at 77° F. at a sacrifice of the adsorption capacity with 10%, 20%, and 40% relative humidity air, processing temperatures of the order of 80–90° F. or higher would be used.

To determine the required low temperature processing necessary to obtain a satisfactory finished product, the following four experiments were performed:

EXAMPLE VIII

A sample of the batch of bead hydrogel described in Example V was cooled immediately after formation and aged for 3 hours at 44° F. before base exchanging. The entire base exchanging operation was performed at 79° F. The hydrogel was washed at 82° F. until it was essentially free of soluble salts, then dried and activated. The experimental technique employed was identical with that used in Example I. Inspections of the finished product were as follows:

Yield of whole beads, weight per cent _____ 72.7
Adsorption capacity, weight per cent moisture @ 77° F.:
    With 10% rel. hum. air. _____ 7.8
    With 20% rel. hum. air _____ 12.0
    With 40% rel. hum. air _____ 23.5
    With 60% rel. hum. air _____ 36.1
    With 80% rel. hum. air _____ 39.7

EXAMPLE IX

A sample of the batch of bead hydrogel described in Example V was cooled immediately after formation and aged for 3 hours at 44° F. before base exchanging. The first 6 hours of base exchanging was performed at 45° F. and the last 12 hours at 79° F. The hydrogel was washed at 81° F. until it was essentially free of soluble salts, then dried and activated. The experimental technique employed was identical with that used in Example I. Inspections of the finished product were as follows:

Yield of whole beads, weight per cent _____ 93.8
Adsorption capacity, weight per cent moisture @ 77° F.:
    With 10% rel. hum. air _____ 7.9
    With 20% rel. hum. air _____ 12.1
    With 40% rel. hum. air _____ 23.5
    With 60% rel. hum. air _____ 35.7
    With 80% rel. hum. air _____ 39.1

EXAMPLE X

A sample of the batch of bead hydrogel described in Example V was cooled immediately after formation and aged for 3 hours at 44° F. before base exchanging. The entire base exchanging operation was performed at 43° F. The hydrogel was washed at 80° F. until it was essentially free of soluble salts, then dried and activated. The experimental technique employed was identical with that used in Example I. Inspections of the finished product were as follows:

Yield of whole beads, weight per cent _____ 98.0
Adsorption capacity, weight per cent
moisture @ 77° F.:
    With 10% rel. hum. air _____ 8.1
    With 20% rel. hum. air _____ 12.4
    With 40% rel. hum. air _____ 24.1
    With 60% rel. hum. air _____ 36.0
    With 80% rel. hum. air _____ 39.7

EXAMPLE XI

A sample of the batch of bead hydrogel described in Example V was cooled immediately after formation and aged for 3 hours at 45° F. before base exchanging. The entire base exchanging operation was performed at 43° F. The hydrogel was washed at 43° F. until it was essentially free of soluble salts, then dried and activated. The experimental technique employed was identical with that used in Example I. Inspections of the finished product were as follows:

Yield of whole beads, weight per cent _____ 98.2
Adsorption capacity, weight per cent
moisture @ 77° F.:
    With 10% rel. hum. air _____ 6.9
    With 20% rel. hum. air _____ 11.2
    With 40% rel. hum. air _____ 22.9
    With 60% rel. hum. air _____ 33.8
    With 80% rel. hum. air _____ 37.0

The advantages of base exchanging in preparing a desiccant are illustrated by the following two examples:

EXAMPLE XII

A batch of bead hydrogel was formed so that the fresh hydrogel contained 1.0% wt. alumina on a water-free basis. A sample of the bead hydrogel was aged for 5-6 hours at 79° F., washed at 83° F., until it was essentially free of soluble salts, then dried and activated. Inspections of the finished product were as follows:

Adsorption capacity, weight per cent
moisture @ 77° F.:
    With 10% rel. hum. air _____ 5.0
    With 20% rel. hum. air _____ 7.2
    With 40% rel. hum. air _____ 12.2

EXAMPLE XIII

Another sample of the batch of bead hydrogel described in Example XII was aged for 5-6 hours at about 75-80° F. before base exchanging. It was base exchanged by applying fresh portions of dilute aqueous solutions of aluminum sulfate every 2 hours for a total of 18 hours; this operation was performed at 75° F. The hydrogel was washed at 77° F. until it was essentially free of soluble salts, then dried and activated. Inspections of the finished product were as follows:

Adsorption capacity, weight per cent
moisture @ 77° F.:
    With 10% rel. hum. air _____ 6.6
    With 20% rel. hum. air _____ 10.3
    With 40% rel. hum. air _____ 20.7

From the results of these examples it is obvious that the removal of zeolitic sodium is desirable in the production of a satisfactory desiccant. However, base exchanging is not necessary in the preparation of silica gel desiccant when the hydrogel is formed at a basicity of 1 pH or less since zeolitic sodium is not formed at this low pH.

The effect of processing desiccant hydrogel at reduced temperatures on the physical characteristics of desiccants containing various metal oxides other than alumina is shown by Table I below. The metal oxides are $ZrO_2$, $Fe_2O_3$, and $Cr_2O_3$. These oxides were co-gelled with silica gel at a basicity of approximately 7 pH in batch-type operations. The gels were broken into lumps and processed both at 40-50° F. and at 70-75° F., then washed at 70-75° F. until they were essentially free of soluble salts. The gels were then dried, activated, and tested. The processing conditions and the physical characteristics of the finished products are presented in Table I.

From the data presented in Table I, it will be noted that the gels containing an oxide of zirconium, iron, and chromium react to reduced temperature treatment in a manner similar to a $SiO_2$—$Al_2O_3$ gel in that the finished product has a greater particle strength and higher adsorption capacity in the lower relative humidity range.

TABLE I

*The effect of processing at reduced temperatures on the physical characteristics of desiccants containing various metal oxides*

| Ex. No. | Metal Oxide Present | Metal Oxide, Wt. Per Cent | Aging Conditions | | Exchange Conditions | | | | Adsorption Capacity, Wt. Per Cent Moisture with— | | | | | Attrition Test [1] Wt. Per Cent Passing |
|---|---|---|---|---|---|---|---|---|---|---|---|---|---|---|
| | | | Time, Hrs. | Temp., °F. | Temp., °F. First 6 hrs. | Temp., °F. Last 12 hrs. | Exc. Sol'n | Concentration, Wt. Per Cent | 10% R.H. Air | 20% R.H. Air | 40% R.H. Air | 60% R.H. Air | 80% R.H. Air | |
| 14 | $ZrO_2$ | 4.95 | 9 | 53 | 48 | 71 | $ZrOCl_2$ | 1.0 | 7.0 | 10.9 | 21.6 | 36.8 | 46.2 | 80.6 |
| 15 | ...do.... | 4.95 | 9 | 74 | 75 | 75 | ...do...... | 1.0 | 6.3 | 9.3 | 17.6 | 33.8 | 57.3 | 39.2 |
| 16 | $Fe_2O_3$ | 1.74 | 9 | 40 | 41 | 67 | $FeCl_3$ | 0.2 | 6.4 | 10.4 | 21.6 | 36.2 | 46.8 | 68.6 |
| 17 | ...do.... | 1.74 | 9 | 71 | 68 | 68 | ...do...... | 0.2 | 5.7 | 9.0 | 17.7 | 35.4 | 56.0 | 25.9 |
| 18 | $Cr_2O_3$ | 1.68 | 9 | 41 | 40 | 69 | $Cr(NO_3)_3$ | 0.3 | 5.5 | 8.2 | 15.9 | 33.5 | 52.7 | 15.5 |
| 19 | ...do.... | 1.68 | 9 | 68 | 68 | 68 | ...do...... | 0.3 | 5.0 | 7.7 | 14.6 | 29.5 | 59.0 | 5.5 |

[1] Test Conditions—40 cc. of 6/16 mesh granular desiccant was rolled in a cylindrical steel vessel, 3½" I. D. x 3⅝" long, with one steel rod, ⅜" diameter x 3½" long, at 80 R. P. M. for 1 hour. Wt. per cent not passing through 28 mesh is reported as "wt. per cent passing."

The effects of processing silica hydrogel which contains no additional oxides at reduced temperatures are shown in Table II. Silica gels were formed by reacting "N" brand sodium silicate with hydrochloric acid to form hydrosols of varying pH. The silica gels formed at pH 7 were processed in the same manner as the metal oxide containing hydrogels described above. The silica hydrogels formed at about 1 pH were aged both at 35 to 40° F. and at 70 to 75° F. for 9 hours, then washed at 35 to 40° F. and 65 to 70° F. respectively until they were essentially free of soluble salts. The silica gels formed at about 1 pH were also washed immediately after gelation both at 35 to 40° and at 65 to 70° F. until they were substantially free of soluble salts. The gels were then dried, activated and tested. The processing conditions and the physical characteristics of the finished products are given in Table II.

TABLE II
The effect of processing at reduced temperatures on the physical characteristics of silica gel desiccants

| Ex. No. | pH of Gel | Aging Conditions | | Exchange Conditions | | | | Wash Condition Temp., °F. | Absorption Capacity, Wt. Per Cent Moisture with | | | | | Attrition Test[1] wt. Per Cent Passing |
|---|---|---|---|---|---|---|---|---|---|---|---|---|---|---|
| | | Time, Hrs. | Temp., °F. | Temp., °F. | | Exc. Solution | Concentration, wt. Per Cent | | 10% R. H. Air | 20% R. H. Air | 40% R. H. Air | 60% R. H. Air | 80% R. H. Air | |
| | | | | First 6 hrs. | Last 12 hrs. | | | | | | | | | |
| 20 | 7 | 9 | 47 | 42 | 72 | NH₄Cl[2] | 0.2 | 69 | 6.6 | 10.6 | 22.6 | 37.5 | 43.4 | |
| 21 | 7 | 9 | 75 | 72 | 72 | do | 0.2 | 68 | 4.9 | 7.8 | 16.1 | 32.1 | 59.0 | |
| 22 | 1 | 9 | 37 | not base changed | | | | 36 | 6.1 | 9.9 | 21.5 | 35.5 | 40.0 | 87.6 |
| 23 | 1 | 9 | 71 | | ex- | | | 68 | 5.5 | 8.9 | 19.3 | 34.1 | 39.8 | 80.3 |
| 24 | 1 | not aged | | not base changed | ex- | | | 36 | 5.4 | 8.7 | 19.9 | 34.5 | 40.8 | 86.7 |
| 25 | 1 | | | | | | | 69 | 6.5 | 10.5 | 22.3 | 33.9 | 37.9 | 87.9 |

[1] Test Conditions—40 cc. of 9/16 mesh granular desiccant was rolled in a cylindrical steel vessel, 3½ I. D. x 3½″ long, with one steel rod, ¾″ diameter x 3½″ long, at 80 R. P. M. for 1 hour. Wt. per cent not passing through 28 mesh is reported as "wt. per cent passing."
[2] The NH₄Cl exchange solution was acidified to 2 pH with HCl since this resulted in higher absorption capacities than were obtained with a non-acidified NH₄Cl exchange solution.

To summarize the general effect of the several variables, Table III is set up on comparative desiccants in each of three groups showing variation of properties with aging temperature, aging time and metal oxide content.

TABLE III
Effect of aging temperature, aging time, and alumina content of freshly formed hydrogel on the adsorption capacity and physical properties of typical bead disiccant[1]

| Per Cent Al₂O₃ in Finished Beads (Exclusive of Exchange Al₂O₃) | Aging Conditions | | Adsorption Capacity, Per Cent Wt. Water Adsorbed | | | | | Physical Appearance Of Finished Beads | Apparent Density Of Finished Desiccant, g. per cc. |
|---|---|---|---|---|---|---|---|---|---|
| | Elapsed Time Between Forming and Base Exchanging, Hours | Temperature of Bead Hydrogel During Aging, °F. | 10% Rel. Hum. | 20% Rel. Hum. | 40% Rel. Hum. | 60% Rel. Hum. | 80% Rel. Hum. | | |
| Effect of Aging Temperature: | | | | | | | | | |
| 1.0 | 3 | 44 | 7.9 | 12.1 | 23.5 | 35.7 | 39.1 | Very good | 0.78 |
| 1.0 | 3 | 63 | 6.0 | 9.7 | 21.2 | 36.6 | 43.3 | Fair | 0.73 |
| 1.0 | 3 | 78 | 6.2 | 9.6 | 20.1 | 38.6 | 48.7 | Poor | 0.68 |
| Effect of Aging Time A Low Temperature: | | | | | | | | | |
| 1.0 | 0.05 | 40 | 7.3 | 11.4 | 22.1 | 31.3 | 31.8 | Good | 0.81 |
| 1.0 | 2 | 40 | 7.3 | 11.8 | 22.8 | 32.1 | 34.8 | Very Good | 0.81 |
| 1.0 | 4 | 40 | 7.8 | 12.2 | 23.6 | 34.8 | 36.6 | do | 0.80 |
| 1.0 | 6 | 40 | 6.7 | 10.7 | 22.3 | 36.8 | 40.3 | do | 0.76 |
| Effect of Alumina Content: | | | | | | | | | |
| 0 | 3 | 40 | 7.4 | 11.6 | 23.6 | 36.5 | 42.5 | Fair | 0.72 |
| 1.0 | 3 | 44 | 7.9 | 12.1 | 23.5 | 35.7 | 39.1 | Very Good | 0.78 |
| 3.0 | 3 | 40 | 6.6 | 10.1 | 21.5 | 34.4 | 38.0 | Good | 0.79 |

[1] These are typical data from a great number of laboratory desiccant production runs. All of the above samples were base exchanged with dilute solutions of aluminum sulfate, water washed, dried, and tempered in bone dry air at 350° F.

I claim:

1. A process for manufacture of adsorbent silica gel which comprises gelling a silica hydrosol to thereby form a hydrogel containing zeolytic alkali metal, reducing the temperature of the resultant hydrogel promptly after gelation, maintaining the temperature of the hydrogel below that at which gelation occurred without substantial base exchange during a substantial period of time before syneresis is complete, and thereafter base exchanging to remove zeolytic alkali metal, washing and drying the hydrogel.

2. A process for manufacture of adsorbent silica gel which comprises gelling a silica hydrosol to thereby form a hydrogel containing zeolytic alkali metal, reducing the temperature of the resultant hydrogel promptly after gelation at a rate of at least about 3° F. per minute, maintaining the temperature of the hydrogel below that at which gelation occurred without substantial base exchange during a substantial period of time before syneresis is complete, and thereafter base exchanging to remove zeolytic alkali metal, washing and drying the hydrogel.

3. A process for manufacture of adsorbent silica gel which comprises gelling a silica hydrosol containing not more than about 3% of metal oxide based on dry weight of solids in said sol to thereby form a hydrogel containing zeolytic alkali metal, reducing the temperature of the resultant hydrogel promptly after gelation, maintaining the temperature of the hydrogel below that at which gelation occurred without substantial base exchange during a substantial period of time before syneresis is complete, and thereafter base exchanging to remove zeolytic alkali metal, washing and drying the hydrogel.

4. A process for manufacture of adsorbent silica gel which comprises gelling a silica hydrosol containing not more than about 3% of alumina based on dry weight of solids in said sol to thereby form a hydrogel containing zeolytic alkali metal, reducing the temperature of the resultant hydrogel promptly after gelation, maintaining the temperature of the hydrogel below that at which gelation occurred without substantial base exchange during a substantial period of time before syneresis is complete, and thereafter base exchanging to remove zeolytic alkali metal, washing and drying the hydrogel.

5. A process for manufacture of adsorbent silica gel which comprises gelling a silica hydrosol containing not more than about 3% of metal oxide based on dry weight of solids in said sol to thereby form a hydrogel containing zeolytic alkali metal, reducing the temperature of the resultant hydrogel promptly after gelation at a rate of at least about 3° F. per minutes, maintaining the temperature of the hydrogel below that at which gelation occurred without substantial base exchange during a substantial period of time before syneresis is complete, and thereafter base exchanging to remove zeolytic alkali metal, washing and drying the hydrogel.

6. A process for manufacture of adsorbent silica gel beads which comprises introducing a gelable silica hydrosol into a body of a fluid immiscible therewith as a plurality of spheroidal globules of said hydrosol, retaining said globules in said fluid until gelation occurs to thereby form a hydrogel containing zeolytic alkali metal, reducing the temperature of the resultant hydrogel spheroids promptly after gelation, maintaining the temperature of the hydrogel below that at which gelation occurred without substantial base exchange during a substantial period of time before syneresis is complete, and thereafter base exchanging to remove zeolytic alkali metal, washing and drying the hydrogel spheroids.

7. A process for manufacture of adsorbent silica gel beads which comprises introducing a gelable silica hydrosol into a body of a fluid immiscible therewith as a plurality of spheroidal globules of said hydrosol, retaining said globules in said fluid until gelation occurs to thereby form a hydrogel containing zeolytic alkali metal, reducing the temperature of the resultant hydrogel spheroids promptly after gelation at a rate of at least about 3° F. per minute, maintaining the temperature of the hydrogel below that at which gelation occurred without substantial base exchange during a substantial period of time before syneresis is complete, and thereafter washing and drying the hydrogel spheroids.

8. A process for manufacture of adsorbent silica gel beads which comprises introducing a gelable silica hydrosol containing not more than about 3% of metal oxide based on dry weight of solids in said sol into a body of a fluid immiscible therewith as a plurality of spheroidal globules of said hydrosol, retaining said globules in said fluid until gelation occurs to thereby form a hydrogel containing zeolytic alkali metal, reducing the temperature of the resultant hydrogel spheroids promptly after gelation, maintaining the temperature of the hydrogel below that at which gelation occurred without substantial base exchange during a substantial period of time before syneresis is complete, and thereafter washing and drying the hydrogel spheroids.

9. A process for manufacture of adsorbent silica gel beads which comprises introducing a gelable silica hydrosol containing not more than about 3% of alumina based on dry weight of solids in said sol into a body of a fluid immiscible therewith as a plurality of spheroidal globules of said hydrosol, retaining said globules in said fluid until gelation occurs to thereby form a hydrogel containing zeolytic alkali metal, reducing the temperature of the resultant hydrogel spheroids promptly after gelation, maintaining the temperature of the hydrogel below that at which gelation occurred without substantial base exchange during a substantial period of time before syneresis is complete, and thereafter base exchanging to remove zeolytic alkali metal, washing and drying the hydrogel spheroids.

10. A process for manufacture of adsorbent silica gel beads which comprises introducing a gelable silica hydrosol containing not more than about 3% of metal oxide based on dry weight of solids in said sol into a body of a fluid immiscible therewith as a plurality of spheroidal globules of said hydrosol, retaining said globules in said fluid until gelation occurs to thereby form a hydrogel containing zeolytic alkali metal, reducing the temperature of the resultant hydrogel spheroids promptly after gelation at a rate of at least about 3° F. per minute, maintaining the temperature of the hydrogel below that at which gelation occurred without substantial base exchange during a substantial period of time before syneresis is complete, and thereafter base exchanging to remove zeolytic alkali metal, washing and drying the hydrogel spheroids.

11. A process for manufacture of adsorbent silica gel beads which comprises introducing a gelable silica hydrosol into a body of a liquid immiscible therewith as a plurality of spheroidal globules of said hydrosol, retaining said globules in said liquid until gelation occurs to thereby form a hydrogel containing zeolytic alkali metal, passing the resultant hydrogel spheroids from said liquid into a flowing stream of cold aqueous solution at a reduced temperature below that of the sol at the time of gelation, flowing said solution with the hydrogel carried thereby to an enlarged soaking zone containing said solution at said reduced temperature, withdrawing a portion of said solution from said soaking zone to provide said flowing stream, maintaining said hydrogel spheroids in said soaking zone without substantial base exchange during a substantial period before syneresis is complete and thereafter base exchanging to remove zeolytic alkali metal, washing and drying the hydrogel spheroids.

12. A process for manufacture of adsorbent silica gel beads which comprises introducing a gelable silica hydrosol containing not more than about 3% of metal oxide based on dry weight of solids in said sol into a body of a liquid immiscible therewith as a plurality of spheroidal globules of said hydrosol, retaining said globules in said liquid until gelation occurs to thereby form a hydrogel containing zeolytic alkali metal, passing the resultant hydrogel spheroids from said liquid into a flowing stream of cold aqueous solution at a reduced temperature below that of the sol at the time of gelation, flowing said solution with the hydrogel carried thereby to an enlarged soaking zone containing said solution at said reduced temperature, withdrawing a portion of said solution from said soaking zone to provide said flowing stream, maintaining said hydrogel spheroids in said soaking zone without substantial base exchange during a substantial period before syneresis is complete and thereafter base exchanging to remove zeolytic alkali metal, washing and drying the hydrogel spheroids.

ROBERT C. WILSON, Jr.

REFERENCES CITED

The following references are of record in the file of this patent:

UNITED STATES PATENTS

| Number | Name | Date |
|---|---|---|
| 1,682,239 | Patrick | Aug. 28, 1928 |
| 1,773,273 | Miller | Aug. 19, 1930 |
| 2,384,946 | Marisic | Sept. 18, 1945 |
| 2,418,232 | Marisic | Apr. 1, 1947 |